United States Patent
Mikami (10) Patent No.: US 6,795,217 B1
(45) Date of Patent: Sep. 21, 2004

(54) IMAGE PROCESSING APPARATUS (75) Inventor: Fumio Mikami, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/557,314

(22) Filed: Apr. 25, 2000

(30) Foreign Application Priority Data

Apr. 28, 1999 (JP) .......................................... 11-122634

(51) Int. Cl.$^7$ .............................................. H04N 1/40
(52) U.S. Cl. ......................................... 358/3.26; 382/296
(58) Field of Search .............................. 358/3.26, 3.24, 358/1.9; 382/289–290, 296–297

(56) References Cited

U.S. PATENT DOCUMENTS 5,185,673 A * 2/1993 Sobol ......................... 358/296
5,646,742 A * 7/1997 Clark et al. ................. 358/3.27
5,914,744 A * 6/1999 Ng ............................. 347/237

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

The density unevenness peculiar to a printer unit is corrected in advance in a reader unit regardless of selection of rotative or non-rotative processing of an output image. The counter instructs a pixel address, which corresponds to the rotative or the non-rotative processing of the output image, to a head shading gamma table number designation table. A table number is input from the head shading gamma table number designation table by a head shading gamma conversion table which stores a head shading gamma table corresponding to a characteristic peculiar to the printer unit and multivalue image data is density converted in accordance with the table number.

48 Claims, 6 Drawing Sheets

IMAGE PROCESSING APPARATUS

BACKGROUND OF THE INVENTION

1. Field of the Invention

The present invention relates to an image processing apparatus, and more particularly to an image processing apparatus which is structured to correct, in advance, density unevenness peculiar to a printer unit in a reader unit and a recording medium for use in generating density correction data in the image processing apparatus.

2. Related Background Art

Conventionally, as a printer unit of a copying machine ink jet printers and electrophotographic system printers have been known.

The ink jet system printer performs printing by jetting ink from a nozzle. An output characteristic of the ink jet system printer is featured by density unevenness occurred depending on difference in ink jet quantity. Density unevenness in outputting can be prevented using head shading technology. In this technology, density unevenness is corrected by performing a density data conversion to form multivalue data which corresponds to each nozzle.

The electrophotographic system printer using an LED (light-emitting diode) array head performs printing by lighting LED's. An output characteristic of the electrophotographic system printer features density unevenness whose occurrences depends on differences in light emission quantity among the LED of the pixels. For this density unevenness, the head shading technology can also be used similar to case of the ink jet system printer. In this technology, density unevenness is corrected by performing density data conversion to form multivalue data which corresponds to each light emission pixel.

In each of the above density unevenness corrections, an image signal output by reading elements in a reader unit, which are arranged in the same direction as that of recording elements in each printer, is sequentially corrected using multivalue data in the order of printing.

A reader unit of a copying machine having a binary outputting printer as a printer unit performs a correction of hue, density or the like on multivalue image data which is read. Thereafter, image data is output to the printer unit by executing area gradation processing depending on binarization processing. Although the correction of hue or density can be performed multivalue data, it is difficult to perform the correction on binary image data on which area gradation processing is executed. That is, it is difficult to perform the correction of hue, density or the like in the printer unit which receives binary data.

Therefore, it is difficult to correct the density unevenness peculiar to the printer unit by processing the binary data in the printer unit. For this reason, it is desired to perform advance correction of density unevenness peculiar to the printer unit on the multivalue image data in the reader unit which is connected to the printer unit and supplies the image data.

In the copying machine, in a case where a printing sheet which has the same direction (orientation) as that of a mounted original is not prepared in a sheet feed cassette, but another printing sheet which has a different direction is prepared, it is desired to improve operability by rotating image data 90° and realizing to perform a printing output onto the other printing sheet in accordance with the rotated image data. Further, it is desired to perform the same rotation processing by means of editing processing.

However, according to the conventional density unevenness correction technology, there is found a problem of not enabling the copying machine to perform the rotation processing of the binary image data after the binarization processing of an original image is performed once in the reader unit.

In a case where the density unevenness is corrected corresponding to the main scanning direction (scanning direction) of a reading image using the conventional density unevenness correction technology and the direction of an image to be printed is rotated 90° according to the corrected data, the printer unit is to perform a printing of subscanning direction using data, on which the density unevenness correction of the main scanning direction has been performed. That is, a reason for not performing the rotation processing is that the above printing output is regarded as one whose output characteristic peculiar to the printer unit is not corrected and normal unevenness eliminating processing cannot be executed.

SUMMARY OF THE INVENTION

An object of the present invention is to solve the above problem.

The present invention provides an image processing apparatus for an image formation apparatus forming images by using a recording element array, which comprises a conversion means for converting image data to compensate recording characteristics of recording elements in the recording element array, a rotation processing means for rotatively processing image data converted by the conversion means, and an output means for outputting image data rotatively processed by the rotation processing means to the image formation apparatus, further comprising:

a control means for controlling the conversion means in accordance with a judgment whether or not the rotation processing means executes rotation processing.

Further, the present invention provides an image processing apparatus for an image formation apparatus forming images by using a recording element array, which comprises a conversion means for converting image data to compensate recording characteristics of recording elements in the recording element array, and a processing means for processing image data converted by the conversion means, further comprising:

a control means for controlling the conversion means in accordance with processed contents of the processing means.

Other objects, structures and effects of the present invention will become apparent from the following detailed description and the attached drawings.

DETAILED DESCRIPTION OF THE PREFERRED EMBODIMENTS

Hereinafter, the preferred embodiments of the present invention will be described in detail with reference to the attached drawings.

Figure 1:
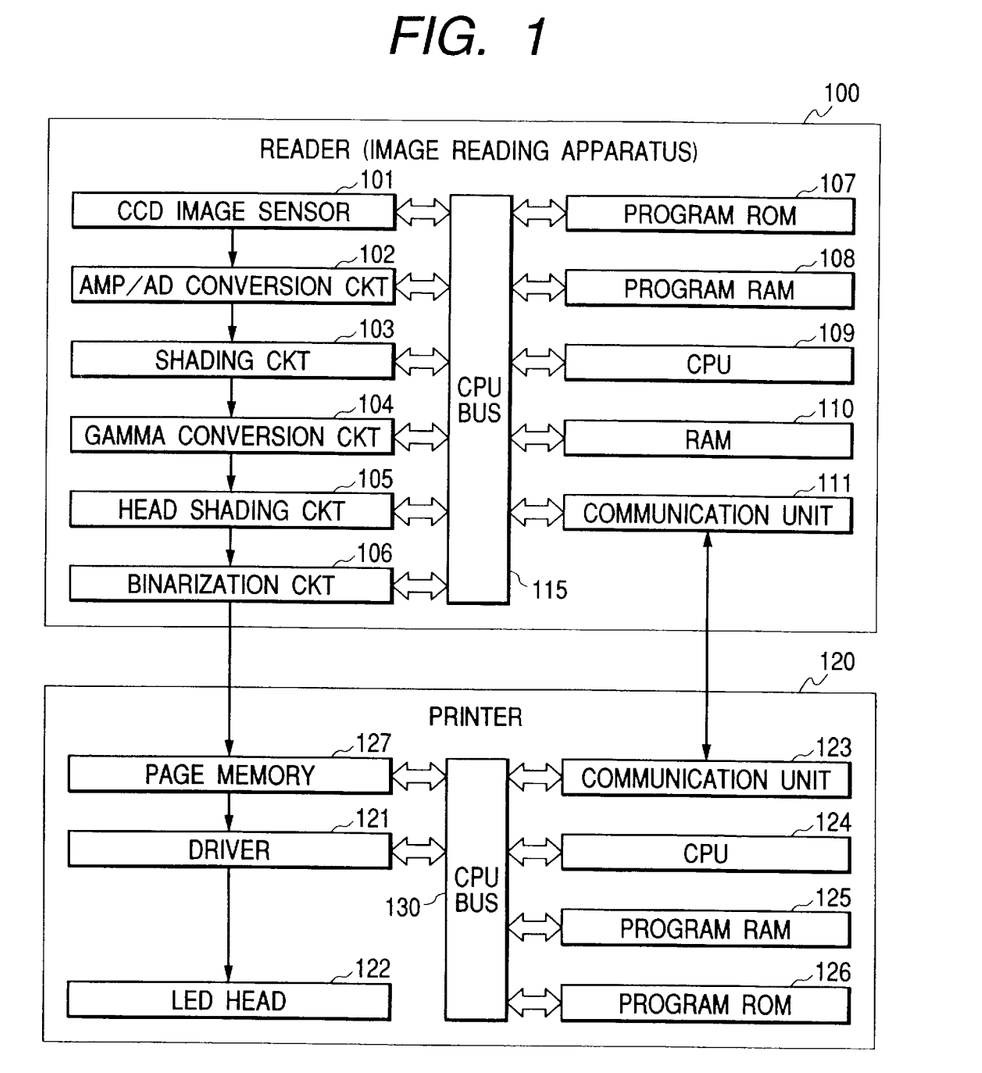
FIG. 1 is a schematic block diagram showing an entire copying machine according to a preferred embodiment of the present invention.

FIG. 1 is a schematic block diagram showing an entire copying machine according to an embodiment of the present invention.

A copying machine 10 has a reader 100 and a printer 120. Each of the reader 100 and the printer 120 has a cage (not shown). For the sake of convenience in giving the explanation, various driving motors, various sensors such as an original sensor, a sheet feeding sensor or the like, an operation panel, a charger, a photosensitive drum, a developing unit, a transfer unit, a fixing unit, cleaner and the like are omitted from FIG. 1.

In the reader 100, numeral 101 denotes a CCD (charge-coupled device) image sensor, numeral 102 denotes an AMP/AD conversion circuit (amplifier/analog-to-digital conversion circuit), numeral 103 denotes a shading circuit, numeral 104 denotes a gamma conversion circuit, numeral 105 denotes a head shading circuit, numeral 106 denotes a binarization circuit, numeral 107 denotes a program ROM (read-only memory), numeral 108 denotes a program RAM (random-access memory) and numeral 109 denotes a CPU (central processing unit). Numeral 110 denotes a RAM which is used in storing head shading data for a shading correction. Numeral 111 denotes a communication unit. The binarization circuit 106 generates binary image data and transmits it to the printer 120. The communication unit 111 is structured by an IC (integrated circuit) and performs a transmission/reception of data, commands, a status signal or the like between the printer 120 and the communication unit 111.

In the printer 120, numeral 122 denotes an LED head having an LED array in which plural LED's are arranged in array state, numeral 121 denotes an LED head driver which drives the LED head 122, numeral 123 denotes a communication unit, numeral 124 denotes a CPU, numeral 125 denotes a program RAM, numeral 126 denotes a program ROM and numeral 127 denotes a binary page memory. The binary page memory 127 stores the binary image data which is transmitted from the, binarization circuit 106. The communication unit 123 is structured by an IC and performs a transmission/reception of data, commands, a status signal between the communication unit 111 and the communication unit 123.

In FIG. 1, a case of outputting an image, which is read by the reader 100, at the printer 120 will be described.

First, when the reader 100 and the printer 120 are powered up, the CPU 109 in the reader 100 performs controlling to set the head shading data stored in the RAM 110 in a table (i.e., a head shading gamma table number designation table 202 later described in FIG. 2) in the head shading circuit 105. A head shading represents density correction processing for each pixel LED in the LED head 122 as mentioned above. For the each pixel LED, a gamma table number for density correction is indicated by the head shading data (correction data).

A procedure to form the head shading data (i.e., the head shading gamma table number designation table 202) will now be described.

Figure 3:
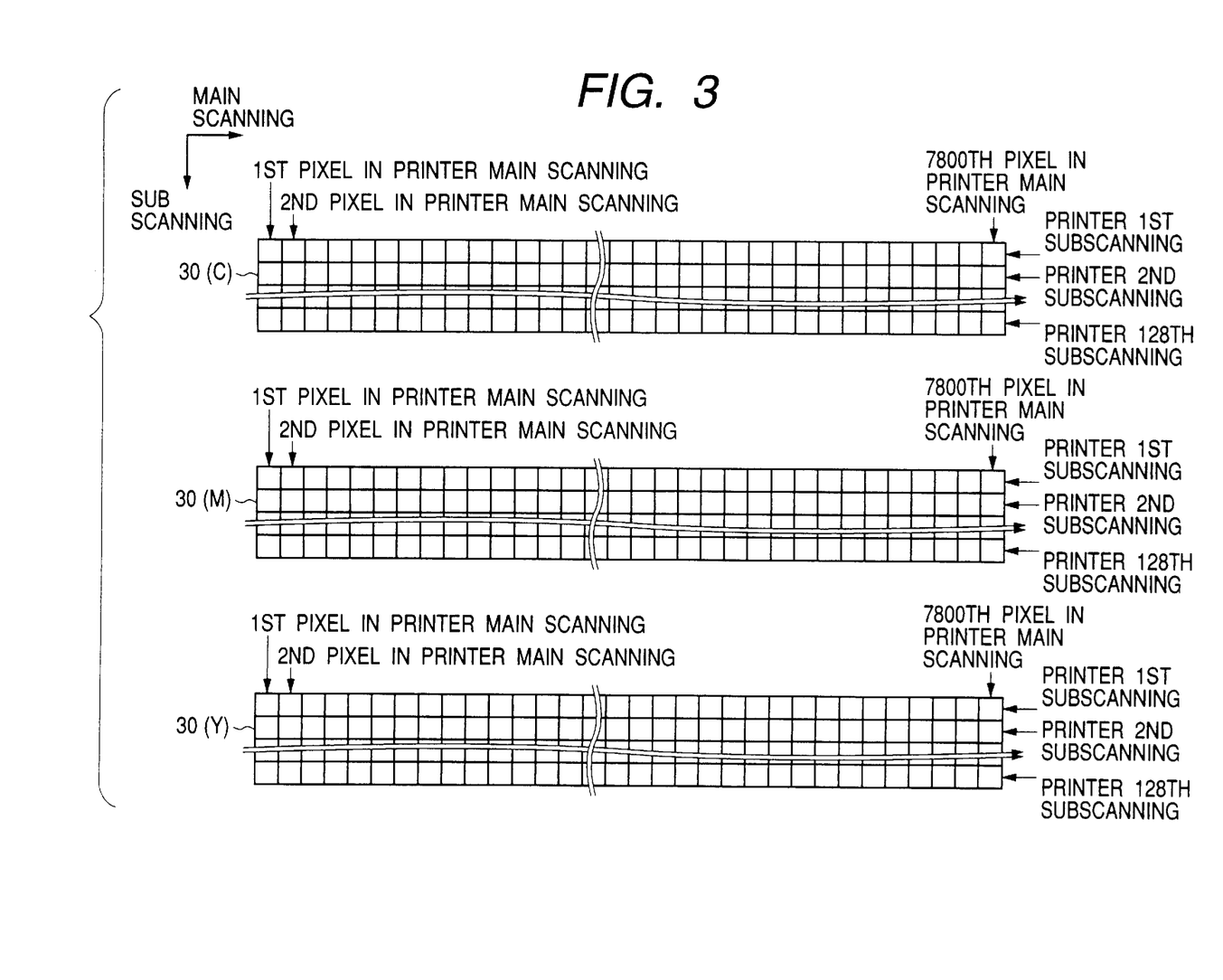
FIG. 3 is an explanation view showing print sample patterns used in producing density unevenness correction data (head shading data) in the copying machine according to the embodiment of FIG. 1.

First, plural bar patterns as shown in FIG. 3 are printed on a recording medium. These print sample patterns are obtained by binarizing multivalue data (8 bits) 80(H). Three bars, which have length correspond to 7800 pixels in the main scanning direction and predetermined width (here, width corresponding to 128 pixels) in the subscanning direction, are printed by actually lighting all of the pixel LED's in the LED head 122. That is, a sample pattern, in which cyan bar 30, magenta bar 31 and yellow bar 32 parallel to each other are printed color by color, is printed. The density of this sample pattern corresponds to a characteristic of the LED head 122.

Next, the pattern printed as mentioned above is read by the reader 100 and pixel density of the CCD image sensor 101 corresponding to each LED element (i.e., an output characteristic peculiar to the LED element) is detected. It should be noted that each pixel of the CCD image sensor 101 corresponds to each element of the LED head 122. According to the detected result, for pixels in low density, a head shading gamma table number for setting the density high level is to be designated. On the other hand, for pixels in high density, the head shading gamma table number for setting the density low level is to be designated. In this gamma table, 64 kinds of variations are prepared in advance, taking into consideration an the expected dispersion of the LED elements' characteristics. Thus, information indicating a light emission characteristic of each LED is stored in the table 202.

The head shading data formed in this way is stored in advance in the RAM 110 as the head shading gamma table number designation table. Since the RAM 110 is backed up by a battery or the like, the head shading table of the printer 120 which is once formed and stored can be used when the reader is restarted after being powered down. Also, a non-volatile NVRAM not requiring a backup system can be used as the RAM 110.

In FIG. 1, when a copy start is instructed from the operation panel (not shown), the reader 100 starts to scan an original mounting board to read an original using the CCD image sensor 101.

The following explanation will be given on the assumption that the mounted original is read by scanning it, for example, in its long side direction, at this time, and a printing is performed without changing relative direction of the original and an image on the original regardless of the direction of a printing sheet when image data is output. That is, (1) in a case where the printing sheet which has the same direction as that of the original is prepared, the image data is printed out without changing the direction of the image, and (2) in a case where the printing sheet which has the same direction as that of the original is not prepared but another printing sheet of which direction is orthogonal to the direction of the original is prepared, the image data is printed out by rotating the image 900.

When the original is scanned and read, the CCD image sensor 101 outputs an image signal which is clamped to a predetermined level by, the AMP/AD conversion circuit 102 and is amplified and A/D converted, whereby eight-bit multivalue image data is generated. Then the shading circuit 103 performs the shading correction to the multivalue image data of the reading image. The gamma conversion circuit 104 performs a gamma correction to the multivalue image data to which the shading correction has been performed.

Further, a density correction is performed to the multivalue image data, to which the gamma correction has been performed, by the head shading circuit 105 to be described later in detail. The binarization circuit 106 performs binarization processing to the density correction data by a method of an error diffusion or the like.

Figure 2:
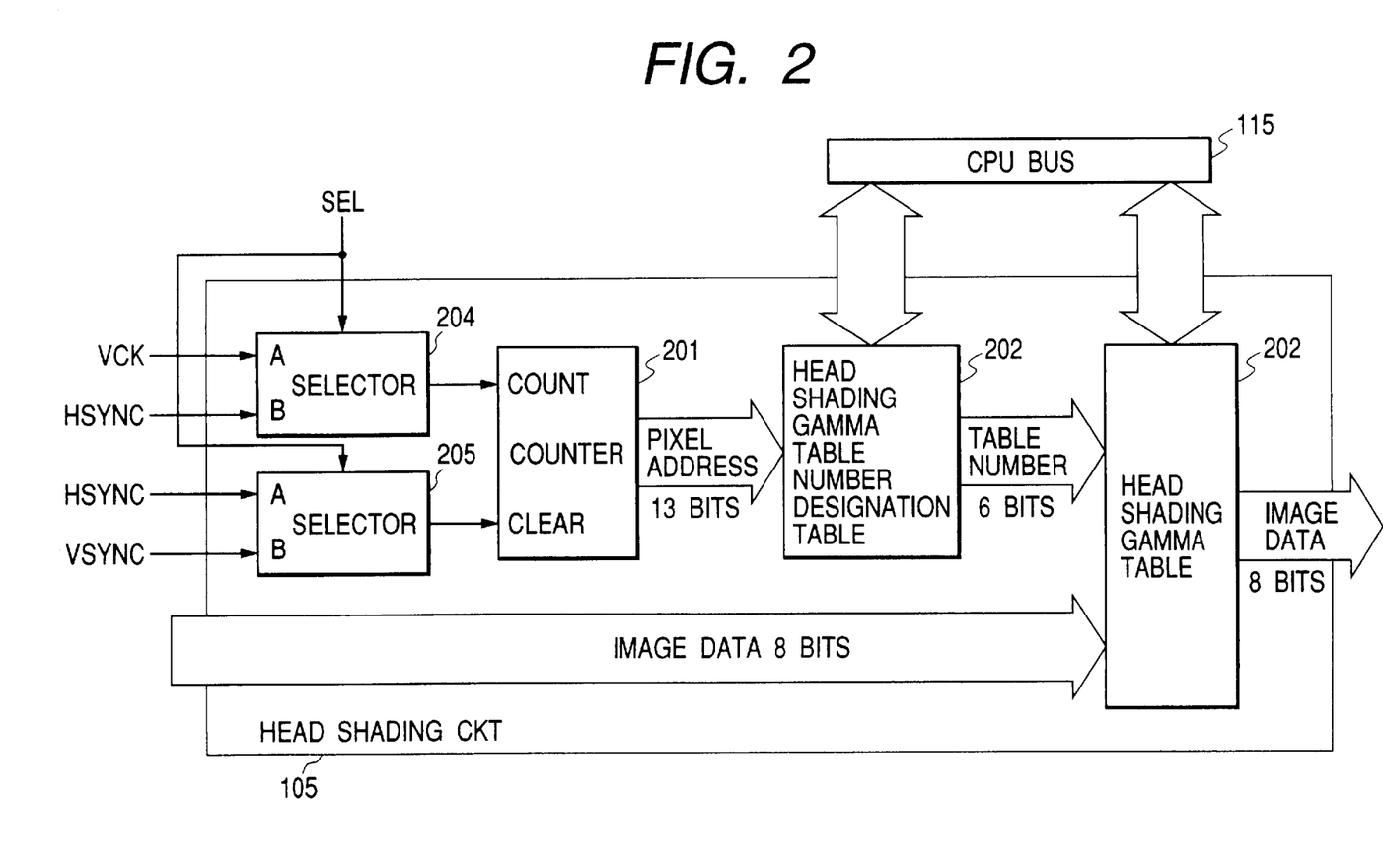
FIG. 2 is a detailed block diagram showing a density unevenness correction circuit (head shading circuit) of the copying machine according to a embodiment of FIG. 1.

FIG. 2 is a detailed block diagram of the density unevenness correction circuit (head shading circuit 105) and a density correcting operation by the head shading circuit 105 will be described with reference to FIG. 2.

In FIG. 2, the head shading circuit 105 has a counter 201, tables 202 and 203 and selectors 204 and 205.

The multivalue image data is density converted by the head shading gamma conversion table 203 corresponding to a table number. Input data of upper six bits at that address is the data of table number selection bits and the table number is input from the head shading gamma table number designation table 202. Data of the lower 8 bits is image data from the AMP/AD conversion circuit 102. That is, the above 64 kinds of head shading gamma tables corresponding to the characteristics peculiar to the printer are stored in the head shading gamma conversion table 203.

The head shading gamma table number designation table 202 is used as a table for designating the table number to the head shading gamma conversion table 203 and an LED address is converted to the head shading gamma table number (six bits). That is, it is instructed as to what address of the LED element in the LED head 122 uses what number of the table among the head shading gamma tables in the head shading gamma conversion table 203, by designating the table number at the head shading gamma table number designation table 202.

In this way, it is possible to instruct that an LED pixel address has to be assigned to what number of the table among the 64 kinds of the gamma tables. This instruction data (table number) is formed by a head shading data forming operation explained with reference to FIG. 3. This instruction data is obtained by transmitting data stored in the RAM 110 as the head shading data through a CPU bus 115 in accordance with controlling of the CPU 109.

The counter 201 instructs a pixel address, which corresponds to rotative or non-rotative processing of an output image, to the head shading gamma table number designation table 202. The counter 201 operates in accordance with a count signal (image clock VCK or main scanning sync signal HSYNC) selected by the selector 204 and a count clear signal (main scanning sync signal HSYNC or page sync signal VSYNC) selected by the selector 205 and count-outputs the LED pixel address. An output bit number thereof is 13 bits.

On the other hand, the image clock VCK is input to an input A of the selector 204, the sync signal HSYNC synchronized with a main scanning is input to an input B of the selector 204, and an input A of the selector 205 and the page sync signal VSYNC is input to an input B of the selector 205, respectively.

Each of the selectors 204 and 205 selectively outputs one of the two inputs in accordance with a selection signal SEL. In a case where the input A is selected, the counter 201 starts a count-up synchronized with the image clock VCK and the count is cleared by the sync signal HSYNC. In a case where the input B of each of the selectors 204 and 205 is selected in accordance with the selection signal SEL, the counter 201 starts the count-up by the main scanning sync signal HSYNC and the count is cleared by the page sync signal VSYNC.

(Non-Rotative Coping)

Figure 5A:
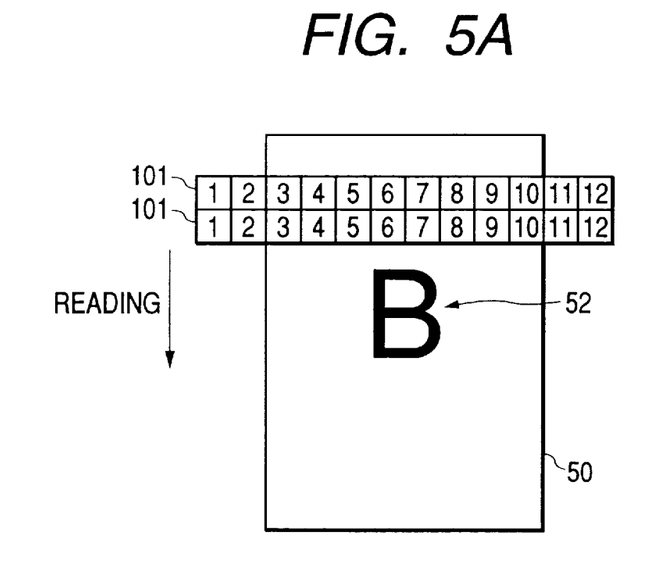
FIGS. 5A and 5B are explanation views showing a relationship between a reading image and a print outputting image in the copying machine when a nonrotative outputting is performed according to the embodiment of FIG. 1.
Figure 5B:
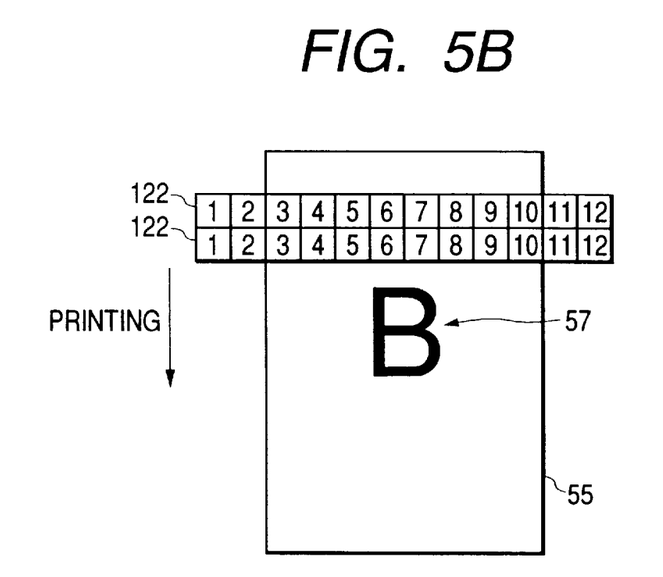

In a case where it is detected that the printing sheet which has the same direction as that of the mounted original is prepared in a sheet feed cassette on the basis of a sensor output, an image 52 on the original is read by performing a scanning in the longside direction of an original 50, as described before, by the CCD image sensor 101 as shown in FIGS. 5A and 5B. Then an output image 57 is printed out without changing its direction on a printing sheet 55, which has the same direction as that of the mounted original 50, in the long-side direction by the LED head 122.

For the sake of convenience in giving the explanation, in FIGS. 5A and 5B, the CCD image sensor and the LED head 122 are shown as the sensor and the head having 12 pixels in the main scanning direction. However, more pixels may be used. Preferably, in a case of reading and recording an image on an A3 sized sheet with pixel density of 600 dpi, about 7000 reading/recording elements are required. A numerical value, which indicates a corresponded relationship with the table number, is independently determined by any value from one to 64 for every one of pixels in actual correspondence to the number of tables and characteristics of the LED elements.

A case of performing a non-rotative copying of the output image as mentioned above will now described with reference to a flow chart shown in FIG. 4.

Figure 4:
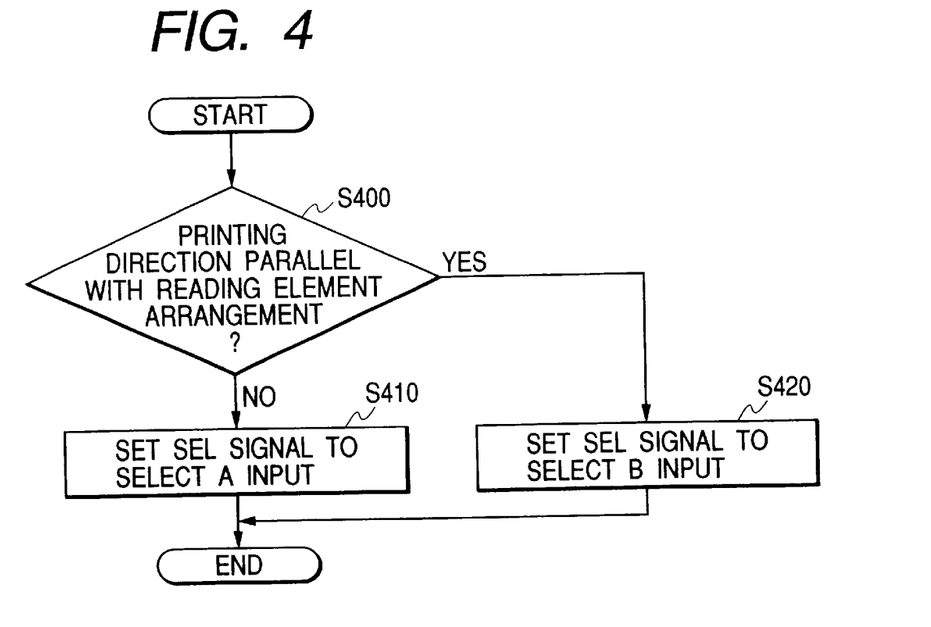
FIG. 4 is a flow chart showing a copying operation of the copying machine according to the embodiment of FIG. 1.

In judgment processing in a step S400 shown in FIG. 4, in a case where it is judged that the printing direction is not parallel with the reading element arrangement direction (the printing sheet which has the same direction as that of the mounted original is prepared in the sheet feed cassette), the selection signal SEL is set to select the input A in a step S410. Therefore, the counter 201 starts the count-up synchronized with, the image clock VCK and the count is cleared in accordance with the main scanning sync signal HSYNC by selecting the respective input A by the selectors 204 and 205 in accordance with the selection signal SEL.

As a result, the counter 201 sequentially outputs the pixel address in the main scanning direction and the head shading gamma table number designation table 202 designates the table number to the head shading gamma conversion table 203 in accordance with the pixel address. For example, the table number shown in FIG. 5A is designated in accordance with the reading scan.

In this way, a density conversion of the multivalue data is performed in the head shading circuit 105. Further, in the binarization circuit 106, binarized image data is output to the printer 120 from the reader 100. Image data from the reader 100 is written in the binary page memory 127.

In a case of performing non-rotative copying of the output image, the image data written in the binary page memory 127 is sequentially read out from the binary page memory 127 in the order of writing the image data and is transmitted to the LED head 122. As is apparent from FIGS. 5A and 5B, in a case where reading elements in the CCD image sensor 101 are parallel to the LED elements in the LED head 122 and have the same arrangement order as that of the LED elements observing from the original 50 side and the printing sheet 55 side, density unevenness of the LED head 122, which depends on differences in light emission quantity peculiar to the LED head 122, is corrected by the above procedure, and the image data is printed out on the printing sheet 55.

The above explanation relates to a case where the arrangement direction of the reading elements read by the reader 100 is parallel with the arrangement direction of the pixels in the LED head 122 of the printer 120, and have the same arrangement order as that of the pixels in the LED 122. After the density correction is performed the multivalue image data with a pixel unit in the order of reading the pixels, the image data is binarized. Then the binary image data is transmitted to the printer 120 to be printed out, and the non-rotative copying of the output image is performed.

(Rotative Coping)

Figure 6A:
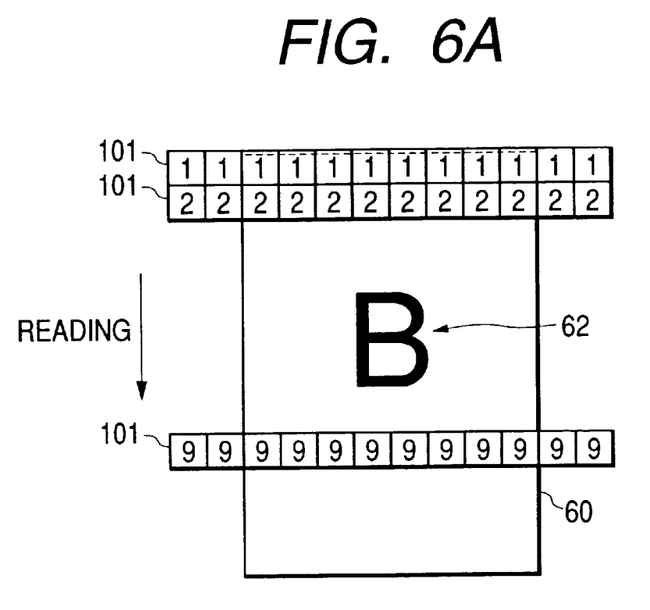
FIGS. 6A and 6B are explanation views showing the relationship between the reading image and the print outputting image in the copying machine when a rotative outputting is performed according to the embodiment of FIG. 1.

Next, the case of requiring to rotate the image data, i.e., the case of detecting that the printing sheet which has the same direction as that of the mounted original is not prepared in the sheet feed cassette but another printing sheet whose direction of orientation is orthogonal to the direction of the mounted original is prepared, on the basis of the sensor output, will be described. At this time, as shown in FIG. 6A, an original image 62 is read by scanning an original 60 in the long-side direction by the CCD image sensor 101. Then, as shown in FIG. 6B, an output image 67 is rotated 90° to be printed out orthogonally to the longside direction of the original on a printing sheet 65, of which direction is orthogonal to the direction of the mounted original 60, by the LED head 122.

Figure 6B:
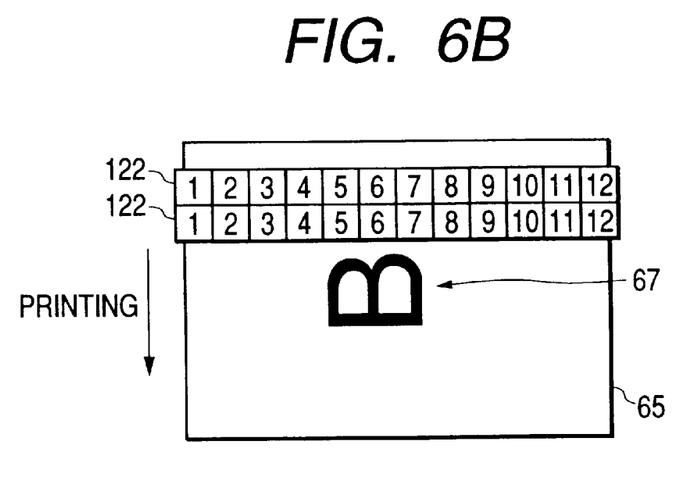

For the sake of convenience in giving the explanation, in FIGS. 6A and 6B, the CCD image sensor 101 and the LED head 122 are shown as the sensor and the head having 12 pixels in the main scanning direction as in FIGS. 5A and 5B. Similarly, as in FIGS. 5A and 5B, the table number indicated by numerical value is independently determined by any value from one to 64 for each of the pixels, in accordance with the characteristics of the LED elements.

A case of performing a copying operation by rotating the output image 90° as mentioned above will be described with reference to the flow chart shown in FIG. 4.

In the judgment processing in the step S400 shown in FIG. 4, in a case where it is judged that the printing direction is parallel to the reading element arrangement direction (the printing sheet which has the same direction as that of the mounted original is not prepared but another printing sheet of which direction is orthogonal to the direction of the mounted original is prepared), the selection signal SEL is set to select the input B in a step S420.

Therefore, the counter 201 starts the count-up synchronized with the image clock VCK, in accordance with the main scanning sync signal HSYNC and the count is cleared in accordance with the page sync signal VSYNC by selecting the respective input B by the selectors 204 and 205 in accordance with the selection signal SEL.

As a result, the counter 201 sequentially outputs the pixel address in the subscanning direction and the head shading gamma table number designation table 202 designates the table number to the head shading gamma conversion table 203 every subscanning in accordance with the pixel address. For example, the table number shown in FIG. 6A is designated in accordance with the reading scan. In this way, the density correction is performed on the multivalue data with a subscanning unit.

Hereinafter, as in the non-rotative coping, the image data is written in or read out from the binary page memory 127 by the reader 100. The data which is read out is transmitted to the LED head 122 and the data is printed out. As is apparent from FIGS. 6A and 6B, in a case where the reading elements of the CCD image sensor O1 are crossed nearly in orthogonal with the LED elements of the LED head 122 observing from the original 60 side and the printing sheet 65 side, the density unevenness of the LED head 122, which depends on difference in light emission quantity peculiar to the LED head 122, is corrected with the sub-scanning unit by the above procedure, and the image data is printed out on the printing sheet 65.

Conventionally, a conversion based on the density peculiar to a printer cannot be performed at the printer side in a binary printer. However, according to the present invention, when the image data is printed out, it is instructed in advance to perform an image rotation, and the image data is binarized by determining the correction direction from the multivalue data before binarization if the density unevenness correction is performed in the main scanning direction or the subscanning direction. Thus, there is obtained effect that the density is corrected corresponding to the direction of a recording medium to the direction of an original image, and the image data is printed on the recording medium by rotatively or non-rotatively processing an output image whose density is corrected.

In the above embodiment, it is judged whether or not the image data is rotated, in accordance with the original mounted direction and the sheet direction in the sheet feed cassette. However, of course, it may be managed so that a user manually instructs to rotate the image data, through an operation unit.

Also, the above embodiment can be modified as follows.

MODIFICATION EXAMPLE 1

In a case of using staplers, it is required that the printing direction is parallel to the long-side direction of an A4 sized sheet, because a stapling device is provided on one of its long sides.

In this case, even if an A4 sized original is mounted on an original mounting board in such a state as its shortside is parallel to the reading main scanning direction, controlling of feeding a sheet to a printer by converting a head shading direction vertically after an has automatical judgment of the original direction, is performed.

A user have not consider the original mounting direction without noticing whether or not the staplers are used. As a result, convenient use is realized.

MODIFICATION EXAMPLE 2

In a case where two A4 sized originals are continuously page-copied to an A3 sized sheet, it is required that the printing direction is parallel to the long-side direction of the A4 sized sheet.

Like the example 1, the user has not to consider the original mounting direction, thereby obtaining simple use.

In a case of folding a sheet in two means of a saddle stitch device using a finisher after performing a page continuous copy, there obtains a similar condition.

MODIFICATION EXAMPLE 3

In a case of copying an original by manually feeding a sheet, if the mounted original sheet direction is orthogonal to the direction of the manually fed sheet, the direction of the original or the manually fed sheet has usually to be changed, by displaying a message for the user. However, according to the present invention, interruption of operation by such a message is not required. As a result, convenient use is realized.

MODIFICATION EXAMPLE 4

In a case where the sheets in a cassette previously designated are lacking when a copying operation of plural sheets is performed, if there are sheets of the same size in another cassette whose direction is orthogonal to the sheet feeding direction, the processing is shifted to processing of orthogonally changing the head shading direction when the previously designated sheets were lacking, and a copying operation can be continuously performed using the sheets whose direction is orthogonal to the sheet feeding direction.

As a result, it is as if the number of sheets held in usable cassettes were increased.

In the above embodiment, shading correction processing is controlled in accordance with the judgment whether or not the image data is to be rotated. However, even if various image processing is performed, without limiting it to rotating the image data, the present invention can be adapted accordingly. For example, in a case of performing enlargement processing or reduction processing in stead of the rotation processing, the counter 201 or the selectors 204 and 205 shown in FIG. 2 may be modified to achieve the processing.

In the above embodiment, an LED printer, which uses an LED array as a recording element array, is described. However, it is obviously understood that the present invention can be adapted to a thermal printer, an ink jet printer or the like.

Although the present invention is described indicating some preferable embodiments, the present invention is not limited to the above embodiments, and various modifications and applications are possible within the spirit and scope of the appended claims.

What is claimed is:

1. An image processing apparatus for an image formation apparatus forming images by using a recording element array, said apparatus comprising conversion means for converting image data to compensate recording characteristics of recording elements in the recording element array, rotation processing means for rotatively processing image data converted by said conversion means, and output means for outputting image data rotatively processed by said rotation processing means to said image formation apparatus, and control means for controlling said conversion means in accordance with a judgment whether or not said rotation processing means executes rotation processing.

2. An apparatus according to claim 1, wherein said conversion means comprises storage means for storing correction data used for compensating the recording characteristics of the recording elements in the recording element array.

3. An apparatus according to claim 2, wherein said storage means stores plural conversion tables.

4. An apparatus according to claim 3, further comprising conversion table selection means for selecting one of the plural conversion tables stored in said storage means,
wherein said conversion means converts the image data in accordance with the table selected by said conversion table selection means.

5. An apparatus according to claim 4, further comprising count means for counting clocks or sync signals,
wherein said conversion table selection means selects one of the plural conversion tables stored in said storage means in accordance with a count value of said count means.

6. An apparatus according to claim 5, further comprising a first selector for selecting a video clock or the horizontal sync signal,
wherein said count means counts outputs from the first selector.

7. An apparatus according to claim 6, wherein said control means causes the first selector to select the horizontal sync signal in a case where said rotation processing means executes rotation processing and causes the first selector to select the video clock in a case where said rotation processing means does not execute the rotation processing.

8. An apparatus according to claim 5, further comprising a second selector for selecting the horizontal sync signal or the vertical sync signal,
wherein said count means clears the count value on the basis of an output from the second selector.

9. An apparatus according to claim 8, wherein said control means causes the second selector to select the vertical sync signal in a case where said rotation processing means executes the rotation processing and causes the second selector to select the horizontal sync signal in a case where said rotation processing means does not execute the rotation processing.

10. An apparatus according to claim 5, wherein said conversion table selection means outputs a table number to said storage means with reference to a table used for designating the table number.

11. An apparatus according to claim 10, wherein the table used for designating the table number is formed on the basis of the recording characteristic of each of the recording elements in the recording element array.

12. An apparatus according to claim 1, further comprising binarization means for binarizing the image data converted by said conversion means,
wherein said rotation processing means rotatively processes image data binarized by said binarization means.

13. An apparatus according to claim 1, wherein said rotation processing means uses a page memory.

14. An apparatus according to claim 1, wherein the image formation apparatus comprises drive means for driving the recording element array on the basis of the rotatively processed image data.

15. An apparatus according to claim 1, wherein the recording element array is an LED array.

16. An apparatus according to claim 1, further comprising read means for reading an original image.

17. An image processing method for use with an image formation apparatus forming images by using a recording element array, said method comprising a conversion step, of converting image data to compensate recording characteristics of recording elements in the recording element array, a rotation processing step, of rotatively processing image data converted in said conversion step, and an output step, of outputting image data rotatively processed in said rotation processing step to the image formation apparatus, and a control step, of controlling execution of said conversion step in accordance with a judgment as to whether or not said rotation processing step is performed to executes rotation processing.

18. A method according to claim 17, wherein said conversion step comprises a storage step, of storing correction data used for compensating the recording characteristics of the recording elements in the recording element array.

19. A method according to claim 18, wherein said storage step includes storing plural conversion tables.

20. A method according to claim 19, further comprising a conversion table selection step, of selecting one of the plural conversion tables stored in said storage step,
wherein said conversion step includes converting the image data in accordance with the table selected in said conversion table selection step.

21. A method according to claim 20, further comprising a count step, of counting clocks or sync signals,
wherein said conversion table selection step includes selecting one of the plural conversion tables stored in said storage step in accordance with a count value obtained in said count step.

22. A method according to claim 21, further comprising a first selection step, of selecting a video clock or the horizontal sync signal,
wherein said count step includes counting outputs from said first selection step.

23. A method according to claim 22, wherein said control step includes causing performance of said first selection step to select the horizontal sync signal in a case where said rotation processing step is performed to execute rotation processing and includes causing performance of said first selection step to select the video clock in a case where said rotation processing step is not performed to execute the rotation processing.

24. A method according to claim 21, further comprising a second selection step, of selecting the horizontal sync signal or the vertical sync signal,
wherein said count step includes clearing the count value on the basis of an output from said second selection step.

25. A method according to claim 24, wherein said control step includes causing performance of said second selection step to select the vertical sync signal in a case where said rotation processing step is performed to execute the rotation processing, and includes causing performance of said second selection step to select the horizontal sync signal in a case where said rotation processing step is not performed to execute the rotation processing.

26. A method according to claim 21, wherein said conversion table selection step includes outputting a table number for use in said storage step with reference to a table used for designating the table number.

27. A method according to claim 26, wherein the table used for designating the table number is formed on the basis of the recording characteristic of each of the recording elements in the recording element array.

28. A method according to claim 17, further comprising a binarization step, of binarizing the image data converted in said conversion step,
wherein said rotation processing step includes rotatively processing image data binarized in said binarization step.

29. A method according to claim 17, wherein said rotation processing step is performed using a page memory.

30. A method according to claim 17, further comprising a drive step, of driving the recording element array on the basis of the rotatively processed image data.

31. A method according to claim 17, wherein the recording element array is an LED array.

32. A method according to claim 17, further comprising a read step, of reading an original image.

33. A storage medium which stores a computer-readable program to execute an image processing method for use in an image formation apparatus forming images by using a recording element array, said method comprising a conversion step, of converting image data to compensate recording characteristics of recording elements in the recording element array, a rotation processing step, of rotatively processing image data converted in said conversion step, and an output step, of outputting image data rotatively processed in said rotation processing step to the image formation apparatus, and a control step, of controlling execution of said conversion step in accordance with a judgment as to whether or not said rotation processing step is performed to execute rotation processing.

34. A medium according to claim 33, wherein said conversion step comprises a storage step, of storing correction data used for compensating the recording characteristics of the recording elements in the recording element array.

35. A medium according to claim 34, wherein said storage step includes storing plural conversion tables.

36. A medium according to claim 35, wherein said method further comprises a conversion table selection step, of selecting one of the plural conversion tables stored in said storage step,
wherein said conversion step includes converting the image data in accordance with the table selected in said conversion table selection step.

37. A medium according to claim 36, wherein said method further comprises a count step, of counting clocks or sync signals,
wherein said conversion table selection step includes selecting one of the plural conversion tables stored in said storage step in accordance with a count value obtained in said count step.

38. A medium according to claim 37, wherein said method further comprises a first selection step, of selecting a video clock or the horizontal sync signal,
wherein said count step includes counting outputs from said first selection step.

39. A medium according to claim 38, wherein said control step includes causing execution of said first selection step to select the horizontal sync signal in a case where said rotation processing step is performed to execute rotation processing, and includes causing performance of said first selection step to select the video clock in a case where said rotation processing step is not performed to execute the rotation processing.

40. A medium according to claim 37, wherein said method further comprises a second selection step, of selecting the horizontal sync signal or the vertical sync signal,
wherein said count step includes clearing the count value on the basis of an output from said second selection step.

41. A medium according to claim 40, wherein said control step includes causing performance of said second selection step to select the vertical sync signal in a case where said rotation processing step is performed to execute the rotation processing, and includes causing performance of said second selection step to select the horizontal sync signal in a case where said rotation processing step is not performed to execute the rotation processing.

42. A medium according to claim 37, wherein said conversion table selection step includes outputting a table number for use in said storage step with reference to a table used for designating the table number.

43. A medium according to claim 42, wherein the table used for designating the table number is formed on the basis of the recording characteristic of each of the recording elements in the recording element array.

44. A medium according to claim 33, wherein said method further comprises a binarization step, of binarizing the image data converted in said conversion step,
wherein said rotation processing step includes rotatively processing image data binarized in said binarization step.

45. A medium according to claim 33, wherein said rotation processing is performed using a page memory.

46. A medium according to claim 33, wherein said method further comprises a drive step, of driving the recording element array on the basis of the rotatively processed image data.

47. A medium according to claim 33, wherein the recording element array is an LED array.

48. A medium according to claim 33, further comprising a read step, of reading an original image.

* * * * *

UNITED STATES PATENT AND TRADEMARK OFFICE
CERTIFICATE OF CORRECTION

PATENT NO.   : 6,795,217 B1
DATED        : September 21, 2004
INVENTOR(S)  : Fumio Mikami It is certified that error appears in the above-identified patent and that said Letters Patent is hereby corrected as shown below:

Column 4,
Line 28, "the" (first occurrence) should be deleted.

Column 7,
Line 60, "O1" should read -- 101 --.

Column 10,
Line 48, "executes" should read -- execute --.

Signed and Sealed this

Twenty-first Day of June, 2005

JON W. DUDAS
*Director of the United States Patent and Trademark Office*